(12) United States Patent
Fritz et al.

(10) Patent No.: US 10,352,826 B2
(45) Date of Patent: Jul. 16, 2019

(54) SYSTEM FOR PRODUCING COLLISIONS BETWEEN A VEHICLE AND A TEST OBJECT

(71) Applicant: 4activeSystems GmbH, Traboch (AT)

(72) Inventors: Martin Fritz, Kobenz (AT); Reinhard Hafellner, Spielberg (AT)

(73) Assignee: 4ACTIVE SYSTEMS GMBH, Traboch (AT)

(*) Notice: Subject to any disclaimer, the term of this patent is extended or adjusted under 35 U.S.C. 154(b) by 444 days.

(21) Appl. No.: 14/779,295

(22) PCT Filed: Mar. 21, 2014

(86) PCT No.: PCT/EP2014/055773
§ 371 (c)(1),
(2) Date: Sep. 22, 2015

(87) PCT Pub. No.: WO2014/147253
PCT Pub. Date: Sep. 25, 2014

(65) Prior Publication Data
US 2016/0054199 A1 Feb. 25, 2016

(30) Foreign Application Priority Data

Mar. 22, 2013 (DE) .................. 10 2013 205 152
Jul. 30, 2013 (DE) .................. 10 2013 214 936

(51) Int. Cl.
*G01M 17/00* (2006.01)
*G01M 17/007* (2006.01)

(52) U.S. Cl.
CPC .............. *G01M 17/0078* (2013.01)

(58) Field of Classification Search
CPC ....... G01M 17/0078; G01M 7/08; G01N 3/30
(Continued)

(56) References Cited

U.S. PATENT DOCUMENTS

2008/0146391 A1* 6/2008 DeGroot .............. B65G 15/26
474/153
2011/0035162 A1* 2/2011 Matlschweiger ....... G01M 7/08
702/41
(Continued)

FOREIGN PATENT DOCUMENTS

DE          19802590 A1    8/1999
DE      102008051233 A1    5/2009
(Continued)

OTHER PUBLICATIONS

Advanced crash avoidance Technologies Program—Final report of the Honda—DRI Team (Dot HS 811 454A) Jun. 2011.

*Primary Examiner* — Tarun Sinha
(74) *Attorney, Agent, or Firm* — E. Victor Indiano; John T. Woods; Indiano & McConnell LLC

(57) ABSTRACT

Embodiments of the invention relate to a system for producing collisions or near-collision situations between a collision body, in particular a vehicle, and a test object. The system comprises a fastening plate having a coupling mechanism, by means of which coupling mechanism the test object can be detachably coupled to the fastening plate, a drive belt which is fastened to the fastening plate, and a drive unit having a drive body for driving the drive belt. The drive unit, the drive belt, and the fastening plate can be placed directly on a floor in such a way that the drive body moves the drive belt and the fastening plate along the floor. The coupling mechanism can be controlled in such a way that the test object is coupled to the fastening plate and can be actively decoupled from the fastening plate from a predetermined operating paint before a collision between the collision body and the test object such that the test object is decoupled from the fastening plate during the collision between the collision body and the test object.

16 Claims, 6 Drawing Sheets

(58) Field of Classification Search
USPC ........................................................ 73/12.01
See application file for complete search history.

(56) References Cited

U.S. PATENT DOCUMENTS

2014/0014473 A1* 1/2014 Zecha .................. G01M 17/007
                                                                              198/617
2014/0102224 A1* 4/2014 Fritz ...................... G09B 23/30
                                                                              73/866.4

FOREIGN PATENT DOCUMENTS

| | | | | |
|---|---|---|---|---|
| DE | 102008022546 A1 | | 11/2009 | |
| DE | 102008025539 A1 | | 12/2009 | |
| DE | 102008030208 A1 | | 12/2009 | |
| DE | 102011012542 A1 | * | 8/2012 | ........ G01M 17/0078 |
| DE | 102011017146 A1 | | 10/2012 | |
| EP | 1010919 A1 | * | 6/2000 | ............... F16G 1/28 |
| EP | 2192567 A1 | | 6/2010 | |
| WO | WO 2006/078890 | | 7/2006 | |
| WO | WO 2009/103518 | | 8/2009 | |
| WO | 5-WO 2014147253 | | 9/2014 | |

* cited by examiner

SYSTEM FOR PRODUCING COLLISIONS BETWEEN A VEHICLE AND A TEST OBJECT

DESCRIPTION

This application claims the benefit of the filing date of the German Patent Applications No. 10 2013 205 152.2 filed 22 Mar. 2013 and No. 10 2013 214 936.0 filed 30 Jul. 2013, the disclosure of which is hereby incorporated herein by reference.

TECHNICAL FIELD

Embodiments of the present invention relate to a system for producing collisions between a collision body, e.g., a vehicle, and a test object, and to a method for producing collisions between a collision body and a test object.

BACKGROUND

In order to test modern vehicle systems, such as for instance various assistance systems for motor vehicles, collisions or near collisions are created between the vehicle being tested and a test object.

For a collision between a vehicle and a test object, for example, the vehicle or test object is placed at rest in a certain position, and the collision partner is accelerated to a certain speed. In order to simulate a real-life collision situation, such as for instance a collision between two vehicles or between a vehicle and a pedestrian in street traffic, the vehicle as well as the test object is set in motion in order to produce a collision. In this context, in particular driver assistance systems can be tested in near real-life situations.

DE 10 2008 030 208 A1 discloses a device and method for producing collision or near collision situations between a test vehicle and a collision object. The test vehicle and the collision object are connected mechanically via a tethering device, such as a cable, and are moved towards each other so as to produce a collision.

DE 10 2011 012 542 A1 discloses a test apparatus for simulating or replicating driving situations, in particular driving situations resulting in near and actual collisions between a test vehicle and a target object. The target object is attached to a guide cable and moved along the guide cable. The guide cable is placed under tension between two fastening devices. The test vehicle is able to move towards the target object and can detach the target object from the guide cable at the moment of a collision between the test vehicle and the target object when a certain load threshold is exceeded.

Description of the Embodiments

There may be a need to provide a system for producing a collision between a test body and a test object, wherein the collision reproduces a real traffic situation as closely as possible.

This object is solved with a system for producing collisions or near collision situations between a test body and a test object, and with a method for producing collisions or near collision situations between a test body and a test object according to the independent claims.

According to a first aspect, a system for producing collisions or near collision situations between a collision body, in particular a motor vehicle, and a test object is described. The system comprises a fastening plate with a coupling mechanism, wherein the test object can be coupled detachably to the fastening plate by means of the coupling mechanism. The system further comprises a drive belt which is fastened to the fastening plate. The system further comprises a drive unit with a drive body for driving the drive belt, wherein the drive unit, the drive belt and the fastening plate can be placed on a floor in such manner that the drive body moves the drive belt and the fastening plate along the floor.

In an exemplary embodiment that will be described in greater detail below in this document, the coupling mechanism can be controlled in such manner that the test object is coupled to the fastening plate and is decoupled from the fastening plate after a predetermined operating point before a collision between the collision body and the test object, so that the test object is decoupled from the fastening plate, in particular by mechanical means, during the collision between the collision body and the test object.

According to a further aspect there is described a method for producing collisions or near collision situations between a collision body and a test object. According to the method, a drive unit, a drive belt and a fastening plate are placed on a floor in such manner that the drive body moves the drive belt and the fastening plate along the floor. The drive belt is fastened to the fastening plate. Additionally, a coupling mechanism is controlled in such manner that the test object is coupled to the fastening plate and is decoupled from the fastening plate after a predetermined operating point before a collision between the collision body and the test object, so that the test object is decoupled from the fastening plate (in particular by mechanical means) during the collision between the collision body and the test object.

The fastening plate can lie on the floor and can be moved along the floor by means of the drive belt, so that the fastening plate slides over the floor. In an exemplary embodiment the fastening plate may have rollers, so that the fastening plate rolls over the floor. In addition, the fastening plate is smooth, flat, and constructed with a drive-on ramp, so that the test body can drive over the fastening plate and brake on it without damaging the fastening plate or the test body. In other words, the fastening plate includes a peripheral area having a first thickness and a centre area having a second thickness, at least part of which is surrounded by the peripheral, the first thickness being thinner than the second thickness. Consequently, installation space may be created in the thicker centre area for certain devices and/or functional elements, such as the magnets that will be described later. The second thickness comprises a value of about 20 mm to 30 mm, in particular about 25 mm. A ramp-like surface or flattened phase (see FIG. 6) with a slope of about 10° relative to the floor extends between the peripheral area and the centre area. This flat configuration of the fastening plate prevents unwanted reflections and inaccurate measurements by the measuring sensors, such as inaccurate measurements of the driver assistance systems to be tested. The fastening plate may have to have a certain minimum dimension to minimum weight in order to provide the test body stability against wind gusts and acceleration forces, for example. The fastening plate has a weight from about 10 kg to about 15 kg (kilograms), for example.

The fastening plate also comprises a contact surface, by means of which the the fastening plate is in contact with the floor. The contact surface comprises a length of one meter and a width of about half a meter. Thus, the fastening plate is at least as long as a walking step, so that a test dummy with spread legs can be fastened on top of the fastening plate as the test object.

The test body may represent a motor vehicle for example, such as a motor car, a lorry or a bus. The test body may also represent a bicycle and/or a motorcycle.

The test object is for example a dummy object that simulates a person, a cyclist and/or a motorcyclist. Further, the test object may represent another vehicle, so that the system can be used to simulate and recreate a collision between two motor vehicles. The test object may also simulate an animal, for example, or a traffic sign, a post or a tree.

The fastening plate comprises a coupling mechanism for coupling the test object to the fastening plate. The coupling mechanism is a mechanical coupling mechanism, for example. The coupling mechanism may have an engaging element, for example, such as an extendable hook, which engages in a corresponding fastening device (such as an engaging lug) at the test object to couple the test object to the fastening plate. The engaging element of the coupling mechanism may for example be moved into a triggering position, so that the engaging element can disengage itself from the fastening device of the test object, in order to release the test object and uncouple it from the fastening plate.

Further, the coupling mechanism may be a magnetic coupling mechanism and may have permanent magnets and electromagnets, for example, as will be described in detail later in this document. The drive belt is fixedly and permanently secured to the fastening plate. The drive belt lies slack, with a contact surface on the floor without the drive belt having to be put under tension. The width of the contact surface is multiple times, for example at least five times, larger than the edge area, that is to say the height or thickness of the drive belt. The width of the drive belt contact surface defines a direction of extension of the drive belts perpendicular to a lengthwise direction of the drive belt. The driving force that drives the drive belt acts substantially along the lengthwise direction.

Because of its small height the drive belt is very flexible and can be twisted about the lengthwise direction of the drive belt. For example, the contact surface lies flat on the floor in a contact area and at a deflection region of the drive belt, e.g., on the drive body, the drive belt is twisted about 90° about its lengthwise direction.

Because of its large width, the drive belt is further rigid about a normal of the contact surface so that it can provide good guidance for the fastening plate.

The drive belt is almost completely inelastic in the lengthwise direction thereof, in order to reduce any relative movement during acceleration and movement of the fastening plate due to stretching. In the following, a drive chain may also be understood as to represent a drive belt. The drive belt may further represent a toothed belt, for example, as will be explained later. The drive belt can be laid loose on the floor, and may be designed flat and narrow enough so that the test body is able to run over the drive belt without damaging the drive belt, the fastening plate or the test body.

The drive unit comprises a drivable driving roller, e.g. a winch or a roll, as the drive body, which is coupled to the drive belt via a frictional or positive lock.

The drive unit further comprises a pressure element which presses the drive belt against the drive roller in such manner that in the case of a frictional lock minimum slippage occurs, and in the case of a positive lock no tooth jump occurs due to the absence of tension in the drive belt. The drive belt and therewith also the fastening plate can be moved along the floor by the driving action of the drive roller.

The drive unit may also comprise a motor for driving the drive body. The motor may for example be an electrically driven motor or a combustion engine.

According to a further exemplary embodiment the coupling mechanism is constructed such that the test object is coupled to the fastening plate in a load-dependent manner, so that, if a mechanical stress is exceeded, following a collision, for example, that is to say if a predetermined collision force/collision impact between the test object and the collision body is exceeded, the test object is decoupled from the fastening plate. In other words, the term "load-dependent" coupling means that during a collision impact of desired intensity the text object is decoupled from the fastening plate. The collision impact at which the coupling mechanism decouples the test object from the fastening plate is selected such that larger defects on the test object, the collision body or the coupling mechanism can be avoided. For example, a load-dependent coupling mechanism can couple the test object to the fastening plate mechanically, if a snap-fit connector or a positive locking connector is used, or a non-positive locking connection such as a press-fit connection, for example.

As was explained earlier, the coupling mechanism is controllable in particular in such manner that, for example, the test object is fastened to and coupled with the fastening plate while the test object is accelerated and moved. At the operating point shortly before the collision, the coupling mechanism releases the test object from the fastening plate, so that during the collision with the collision body the test object is mechanically decoupled from the fastening plate. Mechanically decoupled means that no coupling elements of the test body or of the coupling mechanism are mechanically engaged during the collision, or that very few attraction forces, if any at all, are present due to magnetic interactions between the fastening plate and the test object, for example.

The operating point describes for example a point in time before a collision between the test body and the test object. The operating point may also describe a distance or relative speeds between the test body and the test object.

This ensures that the test object, the fastening plate and the coupling element of the coupling mechanism do not suffer any damage as a result of the collision between the test body and the test object, since the test object is decoupled from the fastening plate at the time of the collision.

In addition, a near-realistic collision is reproduced between the collision body and the test object.

In the event of a crash accident, i.e., in a collision between a vehicle as the collision body and a person, in reality the person is decoupled from the floor. Friction forces are generated between the soles of the person's feet and the floor, and these take effect during a collision with the vehicle. Such a collision in reality can be replicated correspondingly with the system according to embodiments of the invention for producing collisions between a collision body and a test object. At the operating point of the collision the coupling mechanism decouples the test object from the fastening plate, so that the test object is resting on the fastening plate but is mechanically decoupled therefrom. In this way, only friction forces between the contact surfaces of the test object and the fastening plate are effective between the test object and the fastening plate. Thus a highly realistic replication of collisions between a collision body and a test object is produced, which can be achieved through more accurate test results.

According to a further exemplary embodiment, the drive belt is a toothed belt and the drive body has a toothed belt pulley. The toothed belt is coupled with the toothed belt pulley in a positive locking manner and without slippage, and can be pressed against the drive roller via a pressure element. The flat drive belt is offset and twisted through 90° about its lengthwise direction of extension, so that the drive belt encircles the drive wheel, as it were.

A toothed belt is understood to be a drive belt with toothing, which runs in a form-fitting manner in corresponding tooth arrangements in the toothed belt pulley. Teeth are arranged on the inside of the toothed belt, and these engage in corresponding teeth on the outside of the toothed belt pulley and the drive roller, or vice versa. The teeth of the toothed belt may be made from rubber, e.g., neoprene, or plastic, e.g., polyurethane, for example. The form-fitting formation of the toothing between the teeth of the toothed belt and the teeth of the toothed belt pulley makes it possible to transmit more powerful forces more precisely. Also, slippage between the toothed belt and the toothed belt pulley is rendered impossible, so that the movement of the fastening plate, which is coupled to the toothed belt, can be controlled more precisely. In particular, the use of a toothed belt as the drive belt improves the movement back and forth of the fastening plate, thus making it possible to simulate spontaneous changes in direction of the test object.

In addition, the assembly and the setup of the system is made simpler because the toothed belt does not have to be tensioned, due to the form fit with the toothed belt pulley, instead it can be laid slack on the floor. This in turn enables short installation times for the system since no tensioning steps have to be carried out.

In particular, since the toothed belt does not need to be tensioned, unlike in conventional approaches, it is sufficient simply to lay the devices and elements of the system, such as the drive unit or any reversal rollers, on the floor, without fastening them firmly to the floor with fastening means. Since no tensioning forces are effect along the length of the drive belt, the friction between the contact surfaces of the respective devices and the floor is sufficient to ensure that they do not slip during the acceleration and movement of the fastening plate. Thus, all installation steps for fixing the components of the system on the floor can be dispensed with. Consequently, the setup and assembly of the system can be completed considerably faster.

According to a further exemplary embodiment, the drive unit includes a pressure element, and the drive belt is routed between the drive body and the pressure element. The pressure element presses the drive belt against the drive body. In this way, for example, the friction between the drive belt and the drive body is assured, so that slippage between the drive belt and the drive body is reduced or entirely eliminated. Moreover, if the drive belt is a toothed belt, the form fit with the toothed belt pulley is assured when the pressure element presses the toothed belt against the toothed belt pulley.

If the drive belt is lying slackly on the floor, the pressure element may serve to ensure that a driving moment of the drive wheel is transferred to the drive belt, and the drive belt does not become detached from the drive body during the movement.

According to a further exemplary embodiment, the system also has a reversal roller which can be placed on the floor at a distance from the drive unit. The flat drive belt is offset or twisted, threaded around the reversal roller and the drive unit to form a closed loop, for example.

According to a further exemplary embodiment, the coupling mechanism includes a first magnet, e.g., a permanent magnet, and a second magnet, in particular a controllable electromagnet. The first and second magnets are arranged at the fastening plate. In particular, the first and second magnets may be arranged inside the fastening plate and sealed off from the outside environment.

The first magnet is arranged at the fastening plate in such manner that a magnetic attraction force can be generated, which in cooperation with a third magnet, particularly a magnetisable plate at the test object, couples the test object with the fastening plate.

The second is arranged at the fastening plate in such manner that a magnetic repelling force can be generated that counteracts the attracting force, and which, when the repelling force exceeds a predetermined quantity, decouples the test object from the fastening plate.

The attracting force and the repelling force interact with the third magnet of the magnetisable plate at the test object. The test object may include for example metal components, permanent magnets or electromagnets.

The test object may easily be coupled to the fastening plate with the aid of the first magnet, particularly with the aid of the permanent magnet. The test object is decoupled before the collision with the collision body by actuating the second magnet and generating the repelling force, which acts against the magnetic attracting force.

For example, the magnetic attracting force and the magnetic repelling cancel each other out, with the effect that the test object is decoupled from the fastening plate. In addition, the magnetic repelling force may be slightly stronger than the magnetic attracting force, so that the repelling force also acts against the weight force of the test object. Thus, the test object may lie on the fastening plate in a floating, frictionless state. This in turn makes it possible to selectively set desired collision conditions between the collision body and the test object.

Alternatively, the magnetic attracting force may be stronger than the magnetic repelling force, although in this context, this would mean that the test object is considered to be (mechanically) decoupled from the fastening plate. If the magnetic attracting force is selected to be slightly stronger than the magnetic repelling force, for example, increased friction force can be simulated between the test object and the fastening plate, for example, and adjusted in targeted manner.

According to a further exemplary embodiment, the system further contains a sensor device, which measures the position of the collision body relative to the test object. The system also has a control unit, which for the purpose of exchanging signals and data is connected both to the sensor device and to the coupling mechanism in such manner that the control unit controls the coupling mechanism on the basis of the measured position and speed of the collision body.

The sensor device may include pressure plates lying on the floor, for example, over which pressure plates the collision body may travel over. Further, the sensor device may include light barrier sensors that measure the passing of the collision body. The sensor device may also be a differential GPS, which transmits information about the distance and speed between the collision body and the test object to the control unit.

When the sensor device detects the passing by of the collision body, the control unit may control the coupling mechanism accordingly and decouple and disconnect the test object from the fastening plate. With the sensor device, it is possible to decouple the test object from the fastening plate in a short period of time before the collision between the collision body and the test object. Consequently, the fastening plate can remain coupled to the collision body on the fastening plate until shortly before the collision, so that interfering influences, such as gusts of wind or other environmental influences that may have a negative impact on the test object before the collision, and knock it over for example.

According to a further exemplary embodiment, the control unit is also connected with the drive unit in order to exchange signals and data in such manner that the control unit controls the drive unit according to the measured position of the collision body. By means of the precise control of the drive unit, the acceleration and speed of the fastening plate, and correspondingly of the test object, can also be controlled precisely and adjusted at a certain operating point. This enables desired collisions and/or near collision situations between the collision body and the test object to be adjusted in a targeted manner. This may be extremely useful, in particular when testing driving assistance systems.

Wireless transmission technologies such as Bluetooth-, Wireless LAN, NFC (Near Field Communication) technologies may be used to transmit the signals. The control unit, the sensor device, the test object and/or the fastening plate comprise corresponding transmitting and/or receiving units in order to enable a wireless data transmission.

According to a further exemplary embodiment, the system comprises a database, on which data from predetermined motion sequences of the test object along the floor are stored. The database unit is connected to the control unit for the purpose of exchanging data in such manner that the control unit controls the drive unit on the basis of the data. The motion sequences of the test object may simulate a person walking at constant speed, or running at constant speed, for example. It is also possible to readjust motion sequences that simulate a person suddenly standing still, suddenly walking off, or suddenly changing direction. Thus, highly realistic traffic situations between a person as the test object and a collision body can be reconstructed.

It should be noted that embodiments of the invention have been described with reference to various objects of the invention. In particular, some embodiments of the invention are described with device claims, and other embodiments of the invention are described with method claims. However, upon reading this application it will immediately be clear to a person skilled in the art that, unless explicitly stated otherwise, any combination of features that belong to different types of objects of embodiments of the invention is possible as well as a combination of features that belong to a single type of objects of embodiments of the invention.

BRIEF DESCRIPTION OF THE DRAWING

In the following, for the purpose of more detailed explanation and better understanding of embodiments of the present invention, embodiments will be described in greater detail with reference to the accompanying drawing.

DETAILED DESCRIPTION OF EXEMPLARY EMBODIMENTS

Identical or similar components in the figures are identified with the same reference signs. The representations in the figures are schematic.

Figure 1:
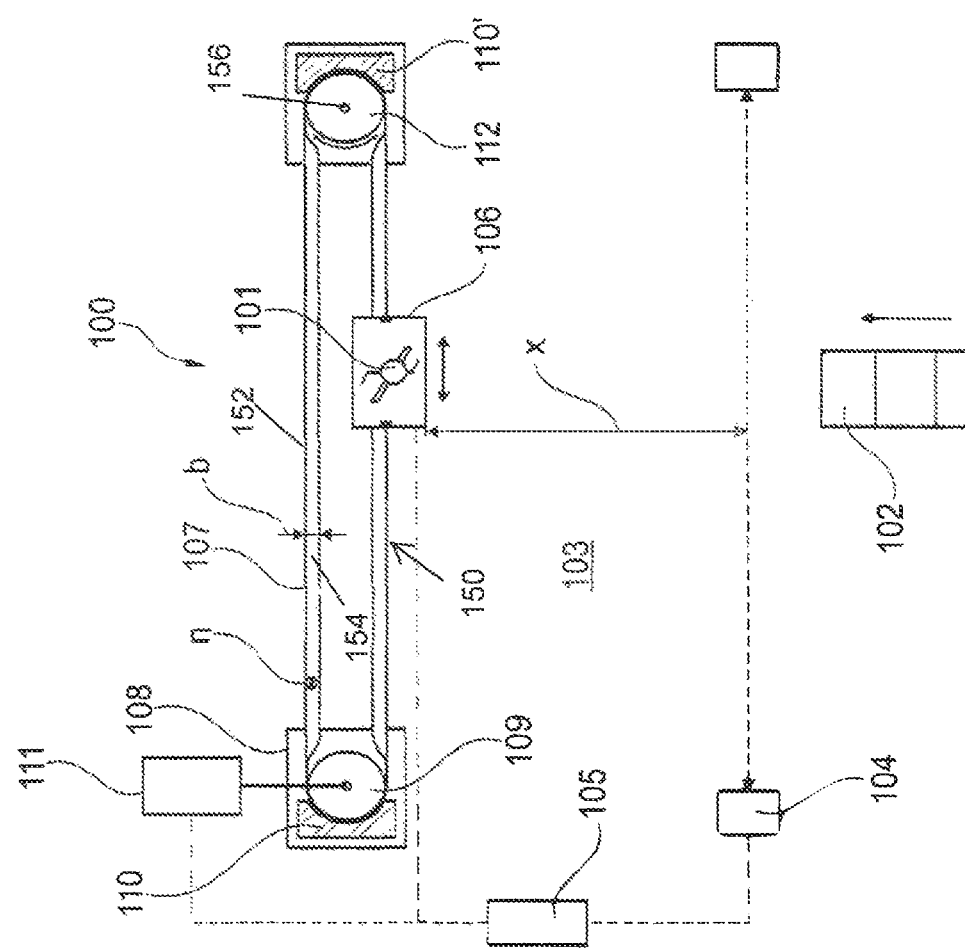
FIG. 1 shows a schematic representation of a system for producing collisions between a collision body and a test object according to an exemplary embodiment of the present invention.

FIG. 1 shows a system 100 for producing collisions between a collision body 102, e.g., motor vehicle, and a test object 101. System 100 includes a fastening plate 106, a drive belt 107 and a drive unit 108. Fastening plate 106 has a coupling mechanism with which the test object 101 can be coupled detachably to fastening plate 106. Drive belt 107 is fastened to fastening plate 106 and is driven by means of drive unit 108. Drive unit 108, drive belt 107 and fastening plate 106 can be placed on the floor 103 in such manner that drive unit 108 moves drive belt 107 and fastening plate 106 along floor 103.

The coupling mechanism can be controlled in such manner that the test object 101 is coupled to fastening plate 106 and is decoupled from fastening plate 106 after a predetermined operating point before a collision between collision body 102 and Lest object 101, so that during the collision, that is to say at the moment of the collision between collision body 102 and test object 101, the test object 101 is mechanically decoupled from fastening plate 106.

During a test run using the system 100 represented in FIG. 1, the collision body 102 travels towards the fastening plate 106 at a first speed. The fastening plate 106 is also moved by the drive unit 108 via drive belt 107, and travels at a second speed. The fastening plate 106 travels for example in a direction orthogonal to the direction of motion of the collision body 102. Alternatively, any angle may be set between the direction of motion of the fastening plate 106 and of the collision body 102.

The coupling mechanism is designed such that the test object 101 is decoupled from the fastening plate 106 shortly before collision takes place between the test object 101 and the collision body 102. In this way, at the time of the collision between the test object 101 and the collision body 102, the test object 101 is not mechanically coupled in a fixed manner to the fastening plate. The advantage of this is that no component of the coupling mechanism is coupled with the test object 101 at the time of the collision, so the risk of a malfunction in these components of the coupling mechanism due to the collision is reduced. Moreover, a realistic collision is simulated, because the test object 101 is mechanically decoupled from the fastening plate 106 and the coupling mechanism, and is merely resting on the fastening plate 106, for example. Consequently, only the weight force of the test object 101 on the fastening plate 106 and a natural friction between the contact surfaces of the test object 101 and the fastening plate 106 are simulated. Thus, a situation close to reality is replicated, in which for example a person as the test object 101 is positioned with his/her feet (rubber shoe soles) on an asphalt surface. Since the fastening plate 106 is not decoupled from the test object 101 until shortly before the collision, for example in a period between 0.1 ms and 2 s, the fastening plate 106 can make rapid changes of direction and accelerate arbitrarily without the test object 101 becoming detached from the fastening plate 106 up until this operating point before the collision. In this way, it is possible to test a driving assistance system in the collision body 102, for example.

The drive belt 107 runs between the fastening plate 106 and a drive body 109 of the drive unit 108. The drive unit 108 may also include a pressure element 110, so that the drive belt 107 is routed between the pressure element 110 and the drive body 109. As a result, the drive belt 107 is pressed against the drive body 109 by the pressure element 110, so that a drive moment and/or a frictional connection can be trans ed from the drive body 109 to the drive belt 107.

As illustrated in FIG. 1, the drive belt 107 may form a closed loop. The drive belt 107 then passes around the drive body 109 at one end and about a reversal roller 112 at the other end. A pressure element 110' may also be arranged at the reversal roller 112, in order to press the drive belt 107 against the reversal roller 112. The fastening plate 106 is fastened to an area of the drive belt 107 between the drive body 109 and the reversal roller 112. The drive body 109 is driven by a motor 111, for example, motor 111 being an electric motor or a combustion engine, for example.

The drive belt 107 is fixedly and permanently fastened to the fastening plate 106. The drive belt 107 lies slack with the contact surface thereof facing the floor 103, and the drive belt 107 does not need to be pretensioned. The width b of the contact surface is multiple times, for example at least five times larger than the edge area, that is to say the height or thickness of the drive belt 107. Because of its small height, the drive belt 107 is very flexible and can be twisted about the lengthwise direction of the drive belt. For example, the contact surface lies flat on the floor 103 in a contact area and on a deflection area of the contact surface, e.g., on the drive body 109, the drive belt is twisted through 90° about its lengthwise direction. Because of its large width b, the drive belt 107 is also rigid with regard to bending about a normal n of the contact surface, so that it can provide better guidance for the fastening plate 106 along the direction of motion or the direction of the lengthwise extension (see double arrow).

The coupling mechanism may be controlled manually, for example, so that the control unit 105 is actuated manually and the fastening plate 106 can be detached from the test object 101.

The system 100 may also comprise a sensor device 104 which measures the position of the collision body 102 relative to the test object 101. The sensor device 104 may be in the form of a pressure plate, for example, which emits a corresponding signal when the collision body 102 runs over it. In FIG. 1, the sensor device 104 is in the form of a light sensor or light barrier, for example. The light barrier measures the passing of the collision body 102. The sensor device 104 may also measure the speed of the collision body 102 as well. The sensor device 104 forwards the measured signals to the control unit 105. The control unit 105 is also connected to the the coupling mechanism in such manner that the control unit 105 controls the coupling mechanism on the basis of the measured position of the collision body 102. For example, the control unit 105 may receive the operating point or the time point and the speed of the test body 102 from the sensor device 104. The control unit 105 also has a knowledge of the distance x between the collision body 102 and the fastening plate 106, for example. From this measured data, it is possible to calculate a time point at which a collision takes place between the collision body 102 and the test object 101 on the fastening plate 106. On the basis of this measured collision time point, the control unit 105 can calculate the decoupling time point, at which the test object 101 is decoupled from the fastening plate 106 and control the coupling mechanism accordingly at this time point.

The control unit 105 may also be connected to the drive unit 108 for the purpose of exchanging signals and data. Thus, the control unit 105 may for example pretend certain motion sequences of the test object 101 and/or the fastening plate 106 (see FIG. 4). A collision between the collision body 102 and the test object 101 may be generated, or equally only a near collision situation between the test object 101 and the collision body 102 may be simulated in a targeted manner by controlling the speed of the fastening plate 106, particularly relative to the collision body 102. In a near collision situation between the test object 101 and the collision body 102, a situation can be simulated in which the collision body 102 passes by the test object 101 in front of the test object 101 or behind the test object 101 in the direction of motion of the test object 101.

Figure 2:
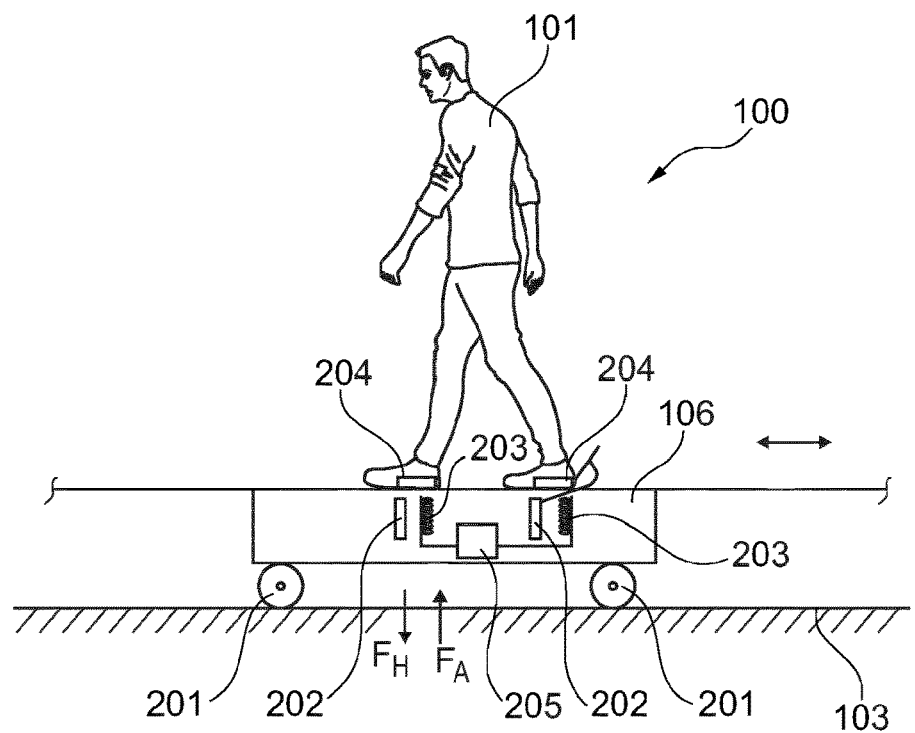
FIG. 2 shows a schematic representation of a test object on a fastening plate which has a magnetic coupling mechanism according to an exemplary embodiment of the present invention.

FIG. 2 shows the fastening plate 106 and the test object 101 in greater detail. The coupling mechanism of the fastening plate 106 comprises a first magnet, such as a permanent magnet 202 for example, and a controllable second magnet, e.g., an electromagnet 203. The test object 101 is correspondingly equipped with a magnet device 204 of a magnetisable plate (e.g. as a third magnet). The magnet device 204 may include a metal or magnetic material, or also a permanent magnet or an electromagnet, so that the magnetic forces of the permanent magnet 202 and the electromagnet 203 can interact with the magnet device 204. In other words, the test object 101 may be coupled with the fastening plate 106 by means of the magnetic forces or the magnetic attracting force FH generated by the permanent magnet 202.

The fastening plate 106 may have an energy storage system 205 for the purpose of operating the the electromagnets 203. In addition, a transmitting and/or receiving device and a corresponding control unit may be integrated in the fastening plate 106.

When the test object 101 is coupled with the fastening plate 106, the electromagnets 203 are deactivated, so that the magnetic attracting force FH of permanent magnets 202 couples the test object 101 with the fastening plate 106. The electromagnets 203 may be activated shortly before the collision, so that a magnetic repelling force FA is generated, essentially counteracting magnetic attracting force FH. The magnitude of magnetic repelling force FA is therefore chosen such that magnetic attracting force FH is completely or almost completely neutralised, and the test object 101 is decoupled from the fastening plate 106. The test object 101 may also be understood to be in the state of being decoupled from the fastening plate 106 if the magnetic repelling force FA is slightly stronger than the attracting force FH or slightly weaker than the attracting force FH. In the case that the magnetic repelling force FA is weaker than the attracting force FH, the test object 101 is held in place at the fastening plate 106 with a weaker magnetic attracting force FH. This enables a stronger friction effect to be simulated between the contact surfaces of the test object 101 and the fastening element 106, for example. In the case that the magnetic repelling force FA is stronger than the magnetic attracting force FH, the weight force of the test object 101 acting on the fastening plate 106 may be reduced so that reduced static friction between the contact surfaces of the test object 101 and the fastening plate 106 can be simulated. If the magnetic repelling force FA is strong enough, the test body 101 may be positioned in a floating state above the fastening plate 106 for example.

The fastening plate 106 may lie on floor 103 with a contact surface facing the floor, or, as shown in FIG. 2, it may be furnished with the rollers 201, so that the fastening plate 106 rolls over the floor 103.

Figure 3:
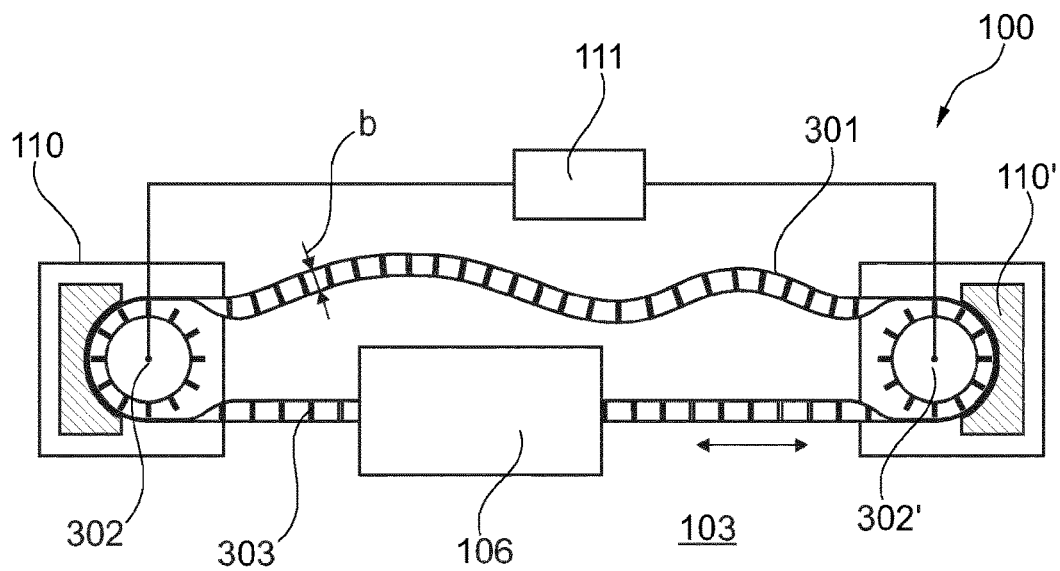
FIG. 3 shows a schematic representation of a system for producing collisions between a collision body and a test object, wherein the drive belt is designed in the form of a toothed belt; according to an exemplary embodiment of the present invention.

FIG. 3 shows a further exemplary embodiment of the system 100, in which the drive belt 107 is in the form of a toothed belt 301, and the drive unit 108 has a toothed belt pulley 302. The toothed belt 301 has a plurality of teeth 303, which engage in form-fitting manner in the toothed belt pulley 302, thereby created a form-fitting contact or e form-fitting coupling between the toothed belt 301 and the toothed belt pulley 302. The form-fitting contact of between the teeth 303 of the toothed belt 301 and the toothed belt pulley 302 makes a non-slip drive possible. The toothed belt 301 may be designed as a closed loop, and may be routed around a toothed belt pulley 302 or additionally around a further toothed belt pulley 302' arranged at a distance, and creating a form-fitting contact with each of the corresponding toothed belt pulleys 302, 302'. In addition, corresponding pressure elements 110, 110' may be included at the corresponding toothed belt pulley 302, 302', in order to press the toothed belt 301 against the corresponding toothed belt pulley 302, 302' more strongly. Because of its small height, the drive belt 301 is very flexible and can be twisted about the lengthwise direction of the drive belt 107. The contact surface lies flat on the floor 103 in a contact area and at a deflection area of the contact area, e.g., at the toothed belt pulleys 302, 302' the contact surface is twisted though 90° about its lengthwise direction. Because of its large width b, the drive belt 107 is also rigid about a normal n of the contact surface, so it can provide better guidance for the fastening plate 106 along the direction of motion or lengthwise direction (see double arrow). In the contact area, the teeth 303 may point towards the floor or, as shown in FIG. 3, they may point away from floor 103.

By configuring the drive belt 107 as a toothed belt 301 and by using the toothed belt pulleys 302, a toothed belt drive system is created. It thus becomes possible for the fastening plate 106 to change directions quickly, so that an extremely wide range of motion sequences can be simulated for the test object 101 (see FIG. 4). Moreover, the toothed belt 301 is able to lie slackly on floor 103, the toothed belt. 301 does not have to be placed under tension between the toothed belt pulleys 302, 302'. This makes it easier to install system 100. Since there are also no tensioning forces acting on the drive unit 108 and/or on the reversal rollers 112 because the toothed belt 301 is not tensioned, the drive unit 108 and the reversal rollers 112 can simply be placed on the floor 103. The fastening elements for securing the drive unit 108 or the reversal rollers 112 to the floor 103 are not necessary. The static friction between the floor 108 and the contact surfaces of the drive unit 108 and/or the reversal rollers 112 is sufficient in order to drive the toothed belt 301 as desired.

Figure 4:
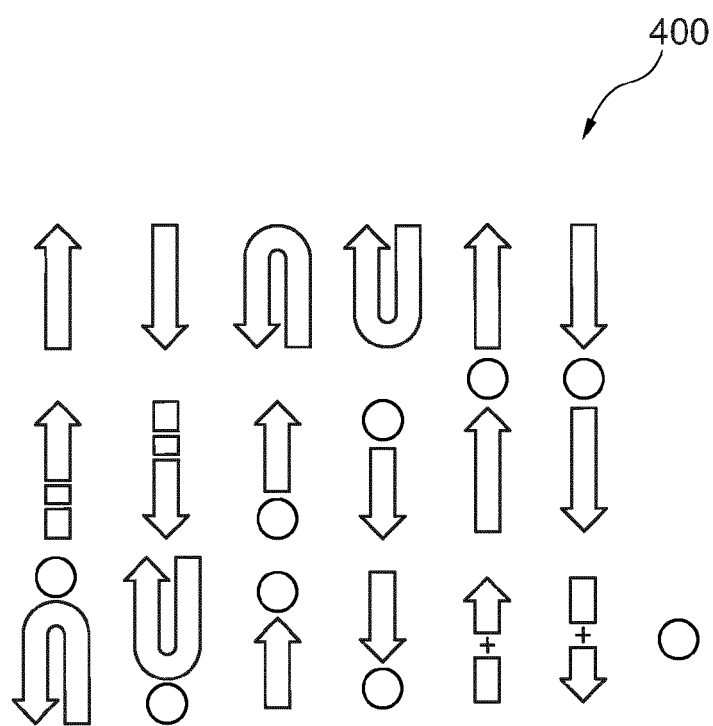
FIG. 4 shows a schematic representation of various motion sequences of the test body.

In FIG. 4, many different motion sequences 400 are displayed. These various motion sequences 400 can be simulated for the test object 101 with the aid of the present system. For example, the test object 101 and the fastening plate 106 may be moved continuously in one direction, or discontinuously, i.e. with pauses and varying speeds along a direction of movement. A direction of movement is indicated by the arrows in FIG. 4. The arrows also comprise interruptions for exemplary purposes, which interruptions are illustrated by circles. Smaller breaks in an arrow indicate for example hesitant or discontinuous movement, which can be replicated correspondingly.

The various motion sequences 400 are stored in a database device, for example, and can be retrieved selectively by the control unit 105.

Figure 5:
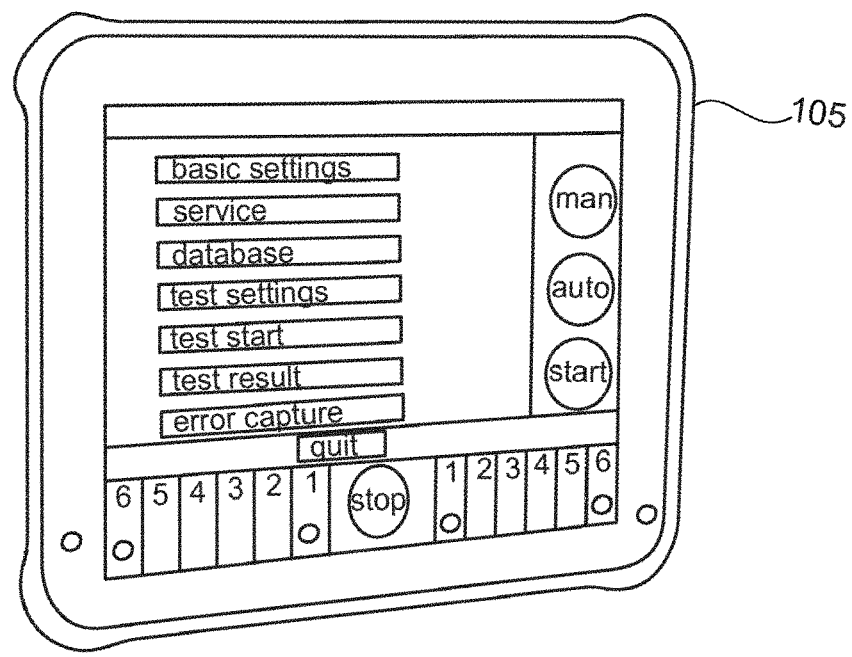
FIG. 5 shows a schematic representation of a control unit according to an exemplary embodiment of the present invention.

FIG. 5 shows a control unit 105 that can be operated by a user. The control unit 105 may be for example a portable computer, such as a notebook or a tablet-PC, as shown in FIG. 5. Moreover, the database unit is set up in the control unit 105. The user can specify a speed for the test object 101 and/or for the test body 102, for example. In addition, an automatic mode can be selected, so that certain required motion sequences 400 are carried out. The control unit 105 correspondingly controls drive unit 108 and/or the speed of the test body 102.

Figure 6:
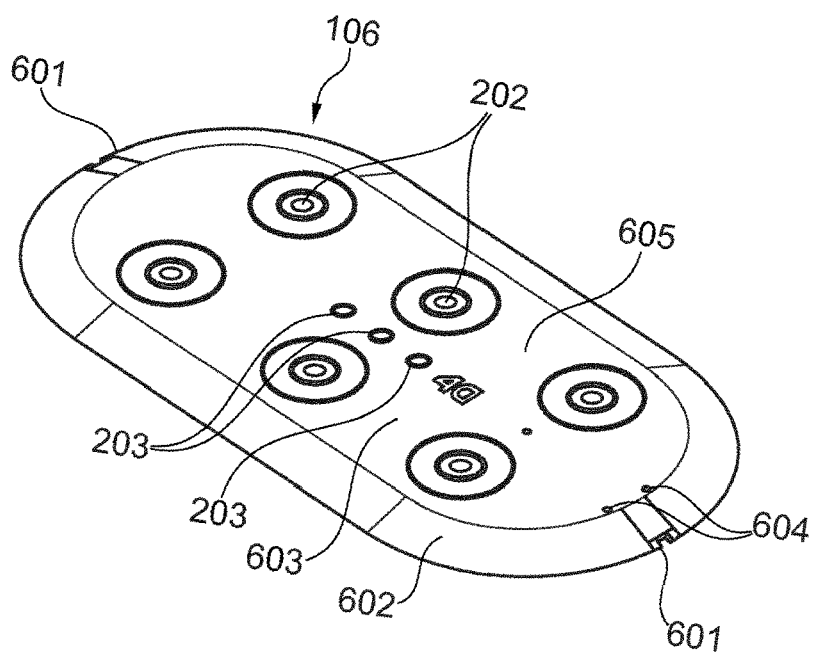
FIG. 6 shows a schematic representation of a fastening plate according to an exemplary embodiment of the present invention.

FIG. 6 shows an exemplary embodiment of the fastening plate 106. The fastening plate 106 comprises for example a flattened phase 602 extending round the periphery thereof, so that the test body 102 is able to run over the fastening plate 106 more easily after a collision. Fastening elements 601 are provided at opposite sides of the fastening plate 106, and this is where the drive belt can be attached. Permanent magnets 202 and electromagnets 203 are shown on a surface of the fastening plate 106. A switch 603 is provided with which the electromagnets 203 can be activated and deactivated manually. The fastening plate 106 is also equipped with charging ports 604, into which a charger or mains plug can be plugged to charge a power supply battery integrated in the fastening plate 106. A control unit integrated in the fastening plate 106, with which for example the electromagnets or the data transmission may be controlled, can be programmed and/or charged via an interface 605.

Figure 7:
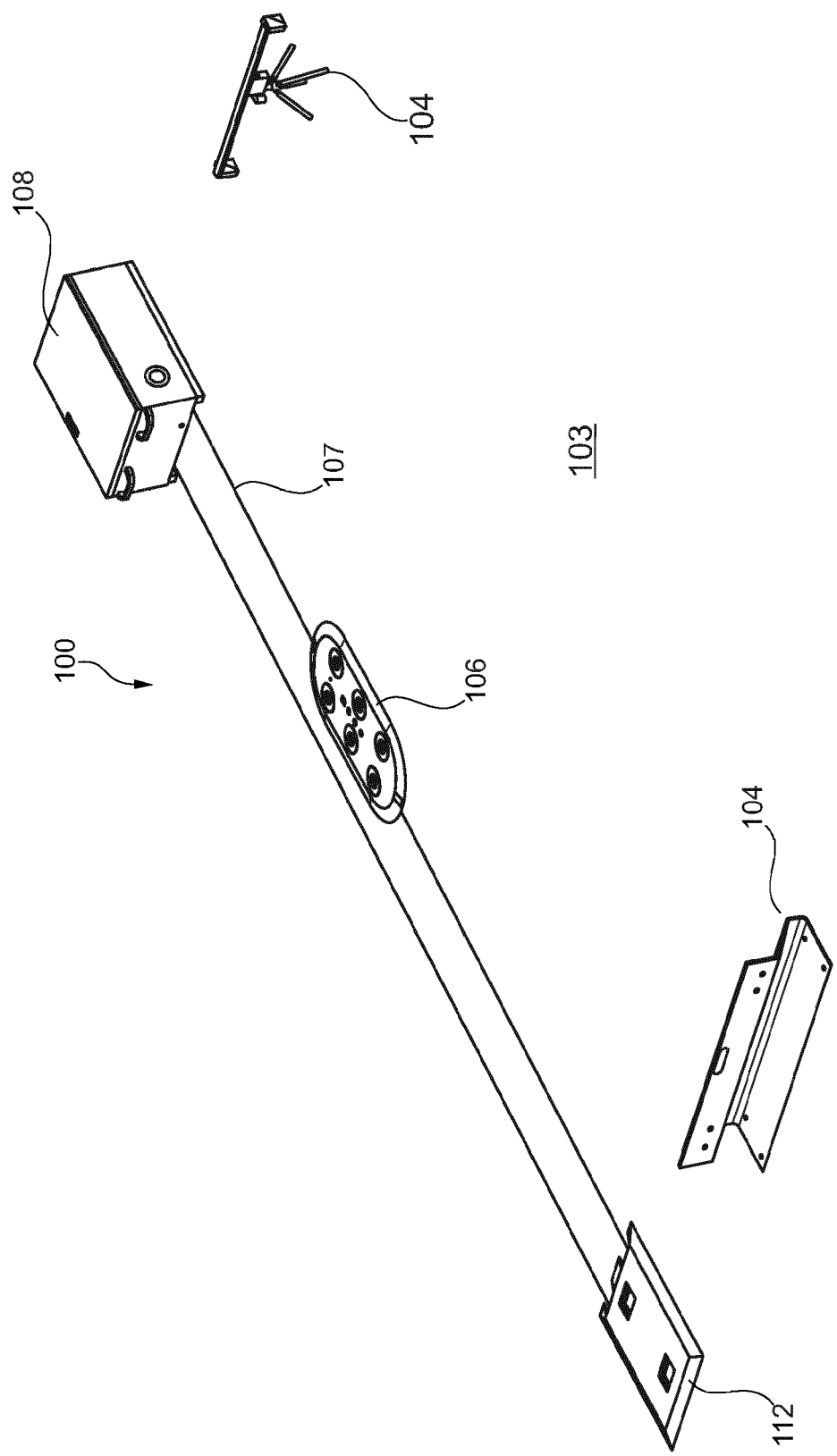
FIG. 7 shows a perspective representation of a system for producing collisions or near-collision situations between a collision body 102 and a test object according to an exemplary embodiment of the present invention.

FIG. 7 is a perspective representation of the system 100 for producing collisions or near-collision situations between a collision body 102 and a test object 101. The drive unit 108, the fastening plate 106, and the reversal roller 112 are placed on the floor 103. The drive belt 107 forms a loop and runs between the drive unit 108 and the reversal roller 112. In addition, a sensor device 104 such as a light barrier arrangement is installed in order to measure a passing by of the test body 102. The elements 104, 106, 107, 108, 112 shown in FIG. 7 may be laid on the floor quite simply, fastening means are not required.

As is indicated in FIG. 7, in an exemplary embodiment the drive belt 107 may be laid on floor 103 in a (pre)tensioned condition.

Figure 8:
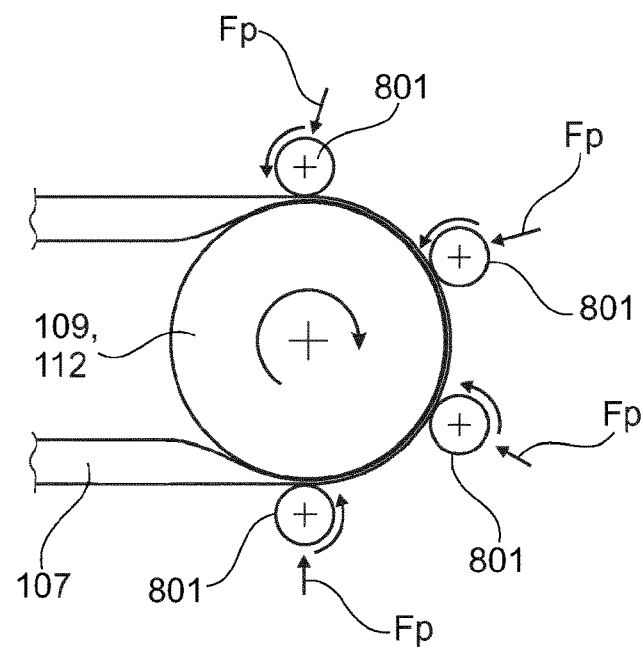
FIG. 8 shows a schematic representation of a pressure element with pressure rollers according to an exemplary embodiment of the present invention.

FIG. 8 shows an exemplary embodiment of the pressure element 110, which is shown schematically in FIG. 1 and FIG. 3 for example. The pressure element 110 may include three, four or more pressure rollers 801 for example, which are mounted so as to be rotatable. In particular, one pressure roller 801 each is arranged at the infeed or outfeed of the drive belts 107 at the drive body 109 and the reversal roller 112.

The axes of rotation of the pressure rollers 801 are aligned parallel to the axis of rotation of the drive body 109 (drive roller) or corresponding to the axis of rotation of the reversal roller 112. The pressure roller 801 exert a pressing force FP on the drive belt 107. The pressing force FP of the pressure rollers 801 is exerted substantially in the direction of the axis of rotation of the drive body 109 or of the reversal roller 112. In this way the drive belt 107 may be pressed against the drive body 109 and the reversal roller 112 by the pressure rollers 801, so that a good frictional or form-fitting lock (if the drive belt is a V-belt) exists between the drive body 109 or the reversal roller 112 and the drive belt 107. Since the pressure rollers 801 have parallel axes of rotation with respect to the axis of rotation of the drive body 109 and the reversal roller 112, and the pressure rollers 801 turn correspondingly together with drive belt 107, the friction, and therewith also the wear between the drive belt 107 and the pressure rollers 801, is minimised.

Figure 9:
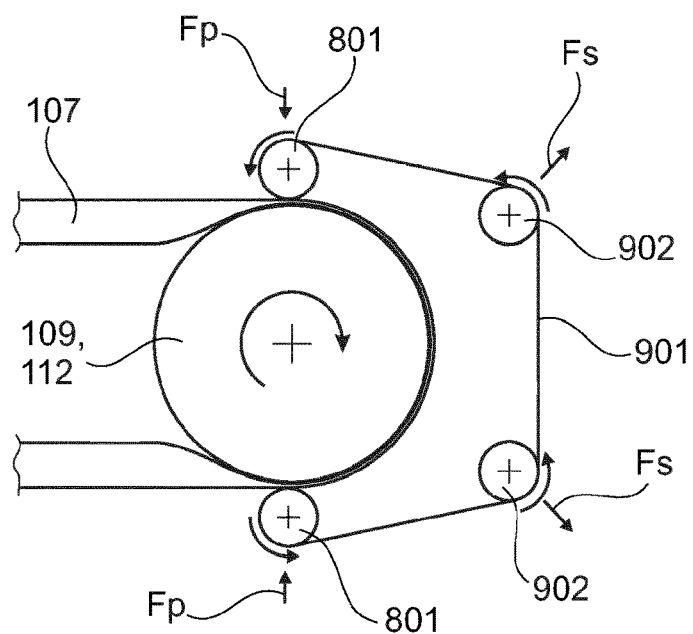
FIG. 9 shows a schematic representation of a pressure element with a pressure belt according to an exemplary embodiment of the present invention.

FIG. 9 shows a further exemplary embodiment of the pressure element 110, which comprises at least two pressure rollers 801 and additionally two tension rollers 902. A pressure belt 901 passes round the pressure rollers 801 and the tension rollers 902. The pressure belt 901 forms a closed loop.

The drive belt 107 passes between the surface of the drive body 109 or the reversal roller 112 and the pressure belt 901. The pressure belt 901 is pressed towards the drive belt 107 and towards the surface of the drive body 109 or the reversal roller 112 by means of the pressure rollers 801 under pressing force FP. The pressing forces FP act in the direction of the axis of rotation of the drive body 109 or the reversal roller 112.

The tension rollers 902 are located at a distance from the drive belt 107 and are set up to tension the pressure belt 901. Die Tension rollers 902 have axes of rotation that are parallel to the axis of rotation of the drive body 109 and the reversal roller 112. The tension rollers 902 also pretension the pressure belt 901 in a tensioning direction FS. The tensioning direction FS extends from the corresponding tension roller 902 in particular in the opposite direction to the axis of rotation of the drive body 109 and the reversal roller 112. The pressure belt 901 is thus placed under tension. The pressure rollers 801 in particular are arranged relative to the drive body 109 and the reversal roller 112 in such manner that a part of the pressure belt 901 lies flush around the drive belt 107 and the surface of the drive body 109 and the reversal roller 112, thereby creating an area force. The area force has the effect of a pressing force FP, and presses the drive belt 107 against the surface of the drive body 109 and the reversal roller 112. Thus, the drive belt 107 is pressed against the drive body 109 and the reversal roller 112 not only at points in the area of the pressure rollers 801, but also by the pressure belt 901 over the entire contact surface between the drive belt 107 and the pressure belt 901. In this way, high static friction is created between drive belt 107 and the surface of the drive body 109 and the reversal roller 112. With this it is ensured that the drive belt 107 lies flush and is fixed at the surface of the drive body 109 and the reversal roller 112 over a large surface area, so that for example a drive moment can be transferred to the drive belt 107 smoothly, without loss and without slippage.

For the sake of completeness, it should be noted that the term "comprising" does not preclude other elements or steps, and "one" or "a" does not preclude a plurality. It should also be noted that features or steps that have been described with reference to one of the exemplary embodiments in the preceding can also be used in combination with other features or steps. Reference signs in the claims are not to be considered limiting.

LIST OF REFERENCE SIGNS

100 System
101 Test object
102 Collision body
103 Floor
104 Sensor device
105 Control unit
106 Fastening plate
107 Drive belt
108 Drive unit
109 Drive body
110 Pressure element
111 Motor
112 Reversal roller
201 Roller
202 Permanent magnet
203 Electromagnet
204 Magnetic device
205 Energy storage system
301 Toothed belt
302 Toothed belt pulley
303 Tooth
400 Motion sequences
601 Fastening element
602 Flattened phase
603 Switch
604 Charging port
605 Interface
801 Pressure roller
901 Pressing belt
902 Tension roller
FH Attractive force
FA Repelling force
b Width of the drive belts
n Normal of the contact surface
FP Pressing force
FS Tension force

What is claimed is:

1. A system for producing collisions or near-collision situations between a collision body, particularly a vehicle, and a test object, wherein the system comprises:
    a fastening plate having a coupling mechanism, wherein the coupling mechanism is configured to detachably couple the test object to the fastening plate;
    a drive belt, which is fastened to the fastening plate, wherein the drive belt is configured to provide guidance to the fastening plate;
    a drive unit with a drive body for driving the drive belt, wherein the drive body is configured to rotate around a vertical axis, wherein the drive unit, the drive belt, and the fastening plate can be placed directly on a floor in such manner that the drive body moves the drive belt and the fastening plate along the floor; and
    wherein the drive belt comprises a contact surface for contact with the floor, wherein a width of the contact surface is greater than a thickness of the drive belt, such that the drive belt is flexible and able to be twisted about a lengthwise direction of the drive belt, and that the drive belt is rigid about a normal of the contact surface.

2. System as set forth in claim 1, wherein the coupling mechanism is designed in such way that the test object is coupled to the fastening plate as a function of load, so that when a mechanical stress is exceeded following an impact between the test object and the collision body, the test object is decoupled from the fastening plate.

3. System as set forth in claim 1, wherein the coupling mechanism is controllable in such a manner that the test object is coupled to the fastening plate, and can be actively decoupled from the fastening plate after a predetermined operating point prior to a collision between the collision body and the test object, so that the test object is decoupled from the fastening plate during the collision between the collision body and the test object.

4. System as set forth in claim 1, wherein the fastening plate includes a tapered periphery to enable the test object to easily traverse the fastening plate after a collision.

5. System as set forth in claim 1, wherein the drive belt is a toothed belt and the drive body is a toothed belt pulley, wherein the toothed belt is coupled to the toothed belt pulley in a form locking manner.

6. System as set forth in claim 5, wherein the drive belt can be laid on the floor without being placed under tension.

7. System as set forth in claim 5, wherein the drive belt can be laid on the floor under tension.

8. System as set forth in claim 1, wherein the drive unit comprises a pressure element, wherein the drive belt is routed between the drive body and the pressure element, wherein the pressure element presses the drive belt against the drive body.

9. System as set forth in claim 1, further comprising a reversal roller that is placeable on the floor at a distance spaced apart from the drive unit, wherein the drive belt is routed around the reversal roller and around the drive unit in order to form a closed loop.

10. System as set forth in claim 1, wherein the fastening plate comprises at least one roller, by means of which the fastening plate can be rolled along the floor.

11. System as set forth in claim 1, wherein the coupling mechanism of comprises a first magnet, in particular a permanent magnet, and a controllable second magnet, in particular an electromagnet, wherein the first magnet is arranged at a fastening plate in such a manner that a magnetic attracting force can be generated, which in cooperation with a third magnet, in particular a magnetizable plate, at the test object, couples the test object to the fastening plate, wherein the second magnet is arranged at a fastening plate in such manner that a magnetic repelling force can be generated which counteracts the attracting force and which actively decouples the test object from the fastening plate when a predetermined amount for the repelling force is exceeded.

12. System as set forth in claim 1, further comprising a sensor device which measures the position of the collision body relative to the test object, a control unit which for exchanging signals and data is connected to the sensor device and the coupling mechanism in such manner that the control unit controls the coupling mechanism on the basis of the measured position of the collision body.

13. System as set forth in claim 12, wherein for exchanging signals and data the control unit is further connected to the drive unit in such manner that the control unit controls the drive unit on the basis of the measured position of the collision body.

14. System as set forth in claim 13, further comprising a database unit, on which there are stored data of predetermined motion processes of the test object along the floor, wherein for exchanging signals and data the database unit is connected to the control unit in such manner that the control unit controls the drive unit on the basis of the data.

15. A method for producing collisions or near-collision situations between a collision body and a test object comprising:

placing a drive unit, a drive belt, and a fastening plate on a floor in such manner that a drive body of the drive unit moves a contact surface of the drive belt and the fastening plate along the floor, wherein the drive belt is fastened to the fastening plate, wherein the drive body is in driving contact with the drive belt, wherein the drive body rotates around a vertical axis, and wherein the drive belt provides guidance to the fastening plate; and controlling a coupling mechanism of the fastening plate in such manner that the test object is coupled to the fastening plate and is decoupled from the fastening plate after a predetermined operating point before a collision between the collision body and the test object, so that the test object is decoupled from the fastening plate during the collision between the collision body and the test object.

16. The method of claim 15, wherein the fastening plate includes a tapered periphery to enable the test object to easily traverse the fastening plate after a collision.

\* \* \* \* \*